United States Patent

[11] 3,600,975

[72] Inventor Anton Ott
 Friedrichshafen, Germany
[21] Appl. No. 855,136
[22] Filed Sept. 4, 1969
[45] Patented Aug. 24, 1971
[73] Assignee Zahnradfabrik Friedrichshafen
 Aktiengesellschaft
 Friedrichshafen, Germany
[32] Priority Sept. 6, 1968
[33] Germany
[31] Z 12 080 and Z 12 081

[54] PLANETARY-GEAR TRANSMISSION WITH ALTERNATELY DRIVEN SUN GEARS
 4 Claims, 11 Drawing Figs.
[52] U.S. Cl. ........................................ 74/761
[51] Int. Cl. ........................................ F16h 57/10
[50] Field of Search ........................................ 74/760, 761

[56] References Cited
UNITED STATES PATENTS

| | | | |
|---|---|---|---|
| 2,546,378 | 3/1951 | Winther | 74/761 |
| 2,689,490 | 9/1954 | Holdeman | 74/761 |
| 2,728,247 | 12/1955 | Snyder | 74/761 |
| 3,024,668 | 3/1962 | Karlsson | 74/761 |
| 3,108,495 | 10/1963 | Winchell | 74/761 |
| 3,355,966 | 12/1967 | Boehm | 74/761 |
| 3,400,609 | 9/1968 | Utter | 74/761 |

*Primary Examiner*—C. J. Husar
*Attorney*—Karl F. Ross

ABSTRACT: An automotive transmission with two cascaded planetary gear trains has the ring gear of one gear train and the planet carrier of the other gear train rigidly connected with each other and with the output shaft, the input shaft being connectable with the sun gear of the last-mentioned gear train during forward driving and with the sun gear of the first-mentioned gear train during reverse driving. The sun gear driven in the several forward speeds has a larger radius than the one driven in reverse, the corresponding ring gears being of substantially identical diameters.

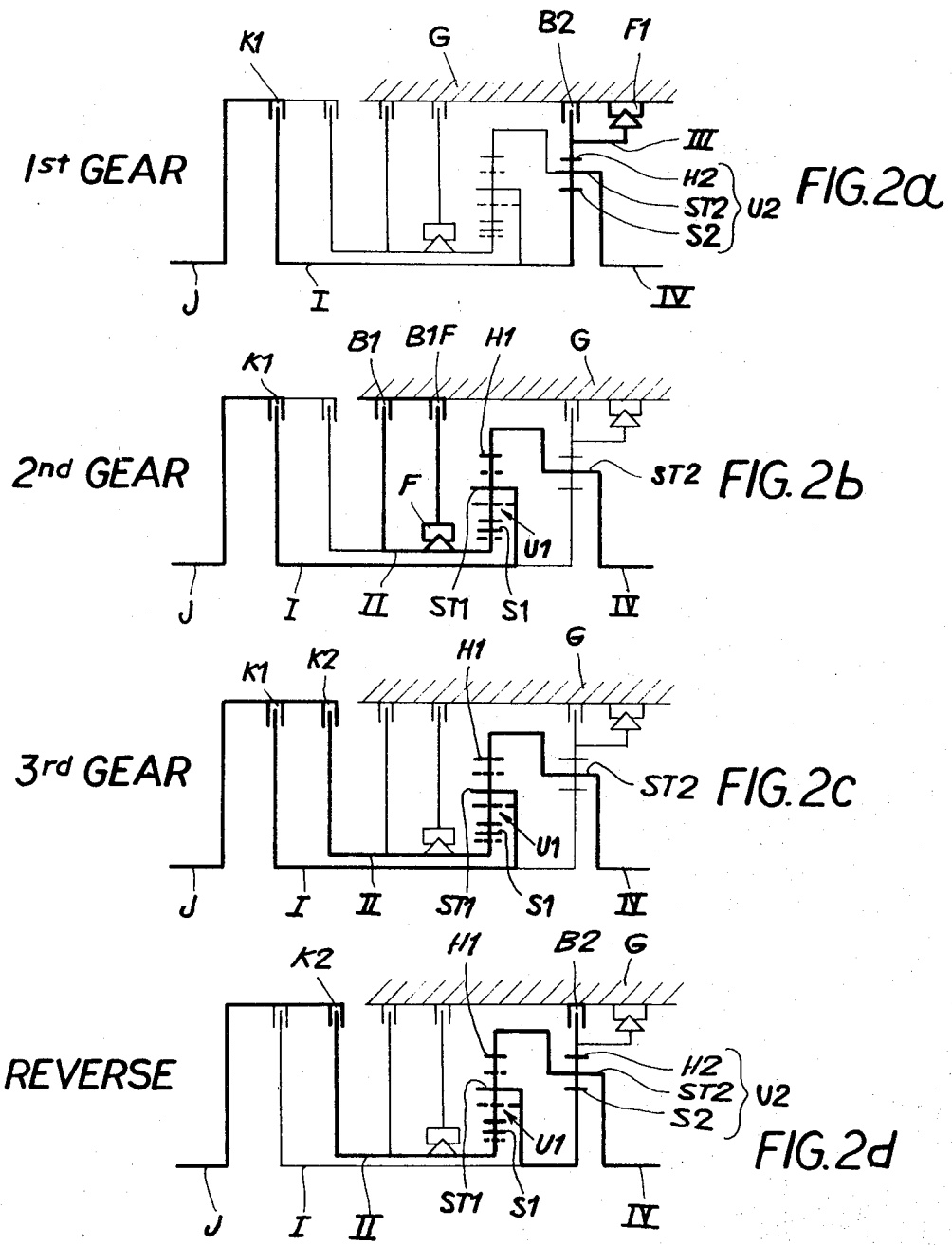

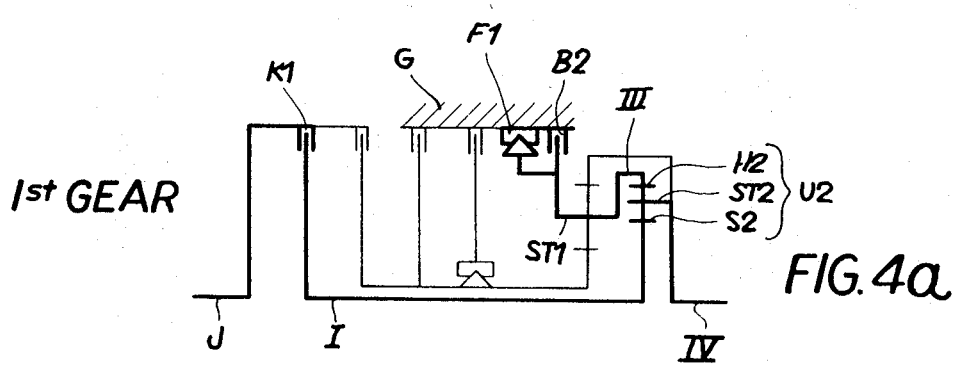
1st GEAR    FIG. 4a
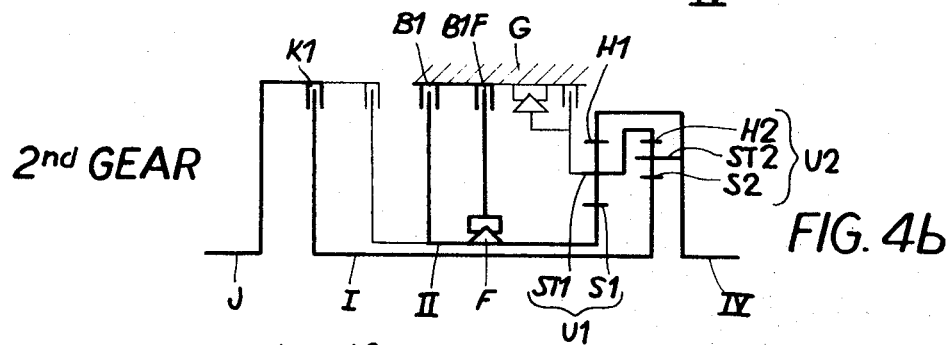
2nd GEAR    FIG. 4b
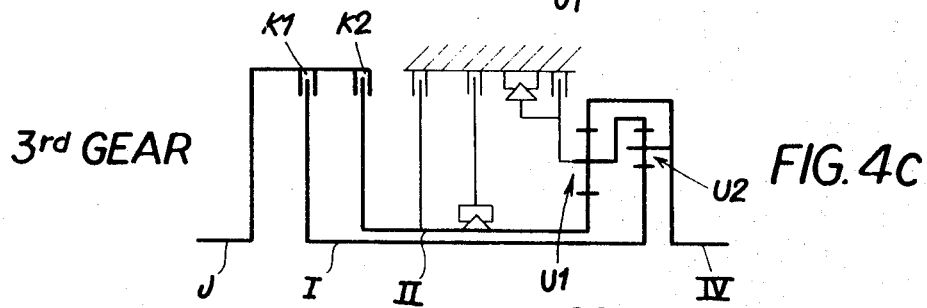
3rd GEAR    FIG. 4c
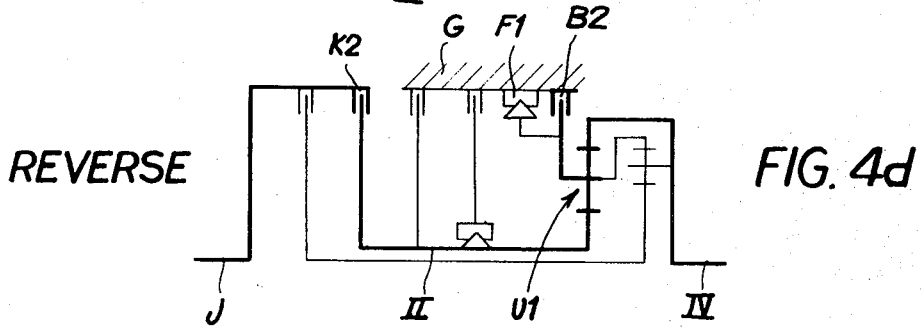
REVERSE    FIG. 4d

PLANETARY-GEAR TRANSMISSION WITH ALTERNATELY DRIVEN SUN GEARS

My present invention relates to an automotive transmission of the type wherein an input shaft, driven by the vehicular engine (generally with interposition of a fluid coupling), is operatively connectable with an output shaft (leading to the traction wheels of the vehicle) through a pair of cascaded planetary gear trains with the aid of selectively actuatable clutches and brakes.

In such a system, e.g. as disclosed in U.S. Pat. No. 2,856,794 to H. W. Simpson, three forward speed ratios of "gears" and one reverse speed ratio can be established by alternatively or jointly coupling the input shaft with two of the six components (two sun gears, two ring gears and two planet carriers) of the two planetary gear trains and by selectively arresting two other components thereof, the establishment of any power train thus requiring the concurrent actuation of two preferably hydraulic coupling elements (clutches and/or brakes). Since the presence of six independently controllable components creates a much larger number of possible power trains than is required in a three-speed transmission, the design of any transmission of this type requires a reduction of the available degrees of freedom by rigidly interconnecting two components of one planetary gear train with two components (not necessarily of the same type) of the other gear train. This leaves four independently rotatable constituents of which one (at least) must be coupled with the input shaft, another must be coupled with the output shaft, and a third must be arrested (or, for direct drive, also joined with the input shaft); the fourth constituent is left floating but will rotate at a speed related to those of the input and output shafts by the dissimilar transmission ratios of the two gear trains. For continuity in shifting between the different forward speeds, it is also desirable to have the input shaft connected to the same component or combination of components in every position other than reverse gear.

Even with these restrictions, there are still numerous possibilities of using two clutches and two brakes in the establishment of the four power trains commonly used for automotive drives. The number of these possibilities is increased by the fact that either or both planet carriers may support more than one set of planet gears per carrier, the use of two intermeshing planet gears or sets of planet gears not only resulting in a reversal of relative sense of rotation between sun gear and ring gear but also introducing a further ratio-determining parameter.

In commonly owned German Pat. specification No. 1,178,307 there has been disclosed a transmission system of this general type wherein, however, the input shaft is selectively connectable with the first and/or the second sun gear by way of respective clutches, the two planet carriers being merged into a single body while the output shaft is rigid with the ring gear of the second planetary gear set whose planet gears are paired for codirectional rotation of the corresponding sun and ring gears upon immobilization of that planet carrier.

Although this system has the advantage of greater compactness, owing to the omission of the first ring gear, it suffers from the drawback that in both first and second gear the torque of the input shaft must be transmitted to the output shaft through the inversely rotating sets of planet gears, with consequent generation of additional frictional resistance in these two forward modes of operation.

On the other hand, the principle of coupling the input shaft alternately with the two sun gears, as first suggested in the aforementioned German patent specification, allows greater flexibility in the dimensioning of the two planetary gear trains as compared with the system of the above-identified Simpson patent in which the rigidly interconnected sun gears have the same or substantially the same diameter. Thus, the object of my present invention is to utilize this principle for providing a transmission system of limited external dimensions, advantageously with approximately equal diameters of the two ring gears.

In accordance with my present invention, the ring gear of one planetary gear train and the planet carrier of the other gear train are rigidly connected with each other and with the output shaft of the system, the associated sun gears being operatively connectable with the input shaft by a first and second clutch, respectively. One of the two clutches, i.e. the one establishing the forward speed ratios, also couples the remaining ring gear or planet carrier with the input shaft when actuated. In the latter case, intermeshing planet gears also engage the driven ring gear and the corresponding sun gear; this gear train, however, intervenes only during driving in second gear or reverse so that the intermeshing planet gears do not transmit any torque at low speed, i.e. when the transmission ratio is highest.

By making the radii of the two sun gears unequal, specifically by assigning a substantially larger radius to the sun gear which is driven at low and intermediate speed, I can obtain favorable stepdown ratios with maintenance of substantially identical radii for the two ring gears.

The invention will be described in greater detail with reference to the accompanying drawing in which:

FIGS. 2a, 2b, 2c and 2d are views similar to FIG. 1 but illustrating the system in four different operating conditions respectively corresponding to the three forward positions and the reverse position of the system of FIG. 1;

FIGS. 4a, 4b, 4c and 4d are views similar to FIGS. 2a–2d, illustrating the system in four different operating conditions respectively corresponding to the three forward positions and the reverse position of the system of FIG. 3.

Figure 1:
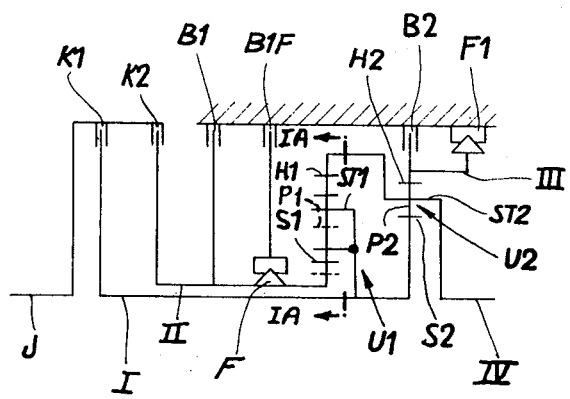
FIG. 1 is a diagrammatic view of a transmission embodying my present improvement.

In conformity with conventional diagrammatic representation, the drawing shows only those parts of the planetary gear trains which lie above the common axis of their sun and ring gears.

In each of the two embodiments disclosed, the system comprises an input shaft J driven from an engine shaft via a hydraulic torque converter, not shown, in the manner described in the above-identified Simpson patent and commonly owned German patent specification. Two hydraulic clutches K1, K2 are individually actuatable to couple the shaft J with an intermediate central shaft I or with a surrounding tubular shaft II. Clutch K1 is invariably actuated for each of the three forward speeds (first, second and third gear); clutch K2 is actuated for third gear ("high speed") as well as for reverse drive. For second gear ("intermediate speed"), shaft II can be arrested by a first hydraulic brake B1 mounted on the gear housing G, a second such brake B2 being engageable with the body III of one of the ring gears of two planetary gear trains U1, U2 to arrest that ring gear for first gear ("low speed") and reverse.

In a manner well known per se, e.g. as described in the above-identified German patent specification, brakes B1 and B2 may be supplemented by overrunning clutches or freewheels for smoother shifting. Thus, brake B1 works in parallel with an optional brake B1F, which engages the shaft II through a freewheel F and goes into action slightly before brake B1, whereas brake B2 is assisted by a parallel-connected freewheel F1.

In the system of FIG. 1, the first planetary gear train U1 comprises a sun gear S1 rigid with shaft II, a planet carrier ST1 rigid with shaft I, and a ring gear H1 rigid with output shaft IV. The second planetary gear train U2 has a sun gear S2 rigid with shaft I and planet carrier ST1, a planet carrier ST2 rigid with shaft IV and therefore with ring gear H1, and a ring gear H2 whose body III is arrestable by brake B2 and freewheel F1, as described above. Planet carrier ST1 supports two sets of meshing planet gears P1, p1', only one gear of each set being shown in FIG. 1a; planet gear P1 engages sun gear S1 whereas planet gear P1' engages ring gear H1. Planet carrier ST2 supports a single set of planet gears P2 in mesh with sun gear S2 and ring gear H2.

The four different power trains establishable by the system of FIG. 1 are shown in heavy lines in FIGS. 2a—2d. In first gear (FIG. 2a) the clutch K1 and the brake B2 are actuated; freewheel F1 is also operative before brake B2 takes effect. With sun gear S1 floating, output shaft IV is driven at a transmission ratio determined exclusively by the parameters of gear train U2.

In second gear (FIG. 2b) clutch K1 is closed, as are brakes B1 and B1F. Output shaft IV rotates at a speed determined exclusively by the parameters of gear train U1, ring gear H2 being kept floating.

In third gear (FIG. 2c) the two clutches K1 and K2 operate concurrently to rigidify the gear train U1 whereby shafts J, I, II and IV rotate in unison.

In reverse (FIG. 2d) clutch K2 and brake B2 are actuated; planet carrier ST1 and sun gear S2, floating, intervene in the power train through their joint engagement, via respective planet gears P1, P1' and P2, with interconnected ring gear H1 and planet carrier ST2.

Figure 3:
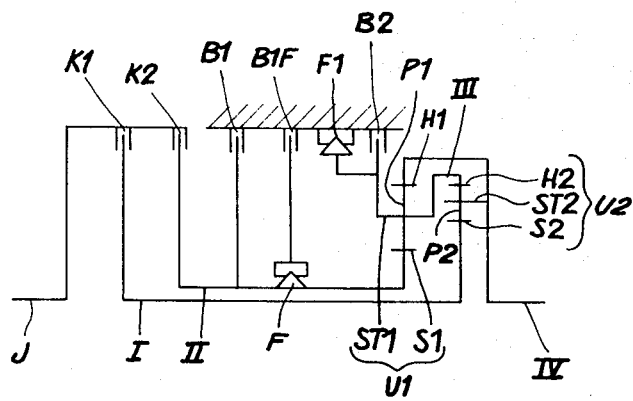
FIG. 3 is a view similar to FIG. 1, illustrating a second embodiment.

The arrangement of FIG. 3 differs from the previous embodiment in that the two planet carriers ST1, ST2 support only one set of planet gears each, i.e. gears P1 in mesh with gears S1, H1 and gears P2 in mesh with gears S2, H2. Output shaft IV is rigid with the first ring gear H1 and the second planet carrier ST2, the body III of ring gear H2 forming with the first planet carrier ST1 a unitary structure arrestable by freewheel F1 and brake B2. As before, shafts I and II are rigid with sun gears S2 and S1, respectively.

The operation of this system is basically the same as that of the first embodiment and has been analogously illustrated in FIGS. 4a–4d.

It will be noted that, in both disclosed embodiments, the radius of sun gear S1 (driven via clutch K2 in third gear and reverse) is considerably smaller than that of sun gear S2 (driven in all forward positions via clutch K1), the radii of the two ring gears H1 and H2 being substantially identical.

The radius of the first sun gear S1 (driven from shaft J via clutch K2) can be made considerably smaller than that of the second sun gear S2, as shown, whereby ring gears H1 and H2 can have substantially identical radii. Since the transmission ratio of a planetary gear train is determined by the quotient R of its outer and inner radii, a desired relationship $R_1 = nR_2$ for the quotients of the two gear trains U1, U2 can be realized by making the radius of H1 equal to $n$ times that of H2 (with S1 and S2 equal in size) or by making the radius of S2 equal to $n$ times that of S1 (with equal radii for H1 and H2). The latter solution, evidently, entails a considerably smaller disparity between the overall dimensions of the two gear trains so as to be realizable with a substantially more compact structure.

Figure 1A:
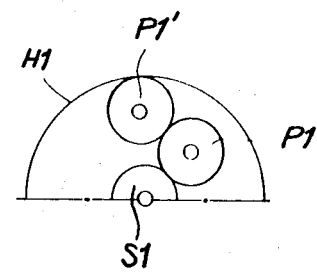
FIG. 1a is a cross-sectional view taken on the line IA—IA of FIG. 1.

In the system of FIGS. 1 and 1a, only the gear ratio $R_2$ is significant for low-speed forward drive (FIG. 2a) whereas ratio $R_1$ plays a part in both second gear and reverse (FIGS. 2b and 2d). In the system of FIGS. 3 and 3a, quotient $R_2$ alone determines the speed ration in first gear (FIG. 4a) whereas quotient $R_1$ controls exclusively the reverse speed (FIG. 4d). In both instances, a relatively high value for $R_1$ (resulting from the small radius of sun gear S1), as compared to that of $R_2$, allows for a maximum stepdown in reverse while also affording a favorable relationship of the stepdown ratios in first and second gear. In the first embodiment, moreover, the larger clearance between the first sun and ring gears S1, H1 affords sufficient space for accommodating the paired planet gears P1, P1' without increase in the overall dimensions of the transmission. Although these planet gears have been shown identical in size, this is not essential.

With the stepdown ratios customary in conventional passenger cars and trucks, the speeds of the planet gears will not be greater than four times the sped of input shaft J in any torque-transmitting position.

I claim:
1. An automotive transmission for providing a plurality of speed ratios between an engine-driven input shaft and an output shaft, comprising:
a first planetary gear train with a first sun gear, a ring gear and a first planet carrier having first planet-gear means in driving engagement with said first sun and ring gears;
a second planetary gear train with a second sun gear, a second ring gear and a second planet carrier having second planet-gear means in driving engagement with said second sun and ring gears, said planetary gear trains being coaxially positioned, said second planet carrier being rigidly connected with said first ring gear and with said output shaft, said first planet carrier being rigidly connected with one of said second sun and ring gears;
first clutch means actuatable for operatively coupling said input shaft with said second sun gear to establish a first, a second and a third forward position;
second clutch means actuatable for operatively coupling said input shaft with said first sun gear to establish the third forward position and a reverse position;
first brake means actuatable for arresting said first sun gear to establish the second forward position;
and second brake means actuatable for arresting said second ring gear to establish the first forward position and said reverse position.

2. A transmission as defined in claim 1 wherein said first planet carrier is rigidly connected with said second sun gear, said first planet-gear means comprising two interengaging planet gears respectively meshing with said first sun gear and with said first ring gear.

3. A transmission as defined in claim 1 said ring gears have substantially identical radii.

4. A transmission as defined in claim 3 wherein said second sun gear is of substantially greater radius than said first sun gear.